United States Patent [19]

Schwier et al.

[11] Patent Number: 4,874,829

[45] Date of Patent: Oct. 17, 1989

[54] PROCESS FOR PREPARING α-METHYLSTYRENE-ACRYLONITRILE POLYMERS

[75] Inventors: Chris E. Schwier, Northampton; Wan C. Wu, Longmeadow, both of Mass.

[73] Assignee: Monsanto Company, St. Louis, Mo.

[21] Appl. No.: 53,222

[22] Filed: May 22, 1987

[51] Int. Cl.$^4$ .................. C08F 212/12; C08F 220/44
[52] U.S. Cl. .................. 526/262; 526/272; 526/329.2; 526/329.3; 526/342
[58] Field of Search ............ 526/342, 262, 272, 329.2, 526/320.3

[56] References Cited

U.S. PATENT DOCUMENTS

| | | | |
|---|---|---|---|
| 2,769,804 | 11/1956 | Hanson | 260/86.7 |
| 3,766,142 | 10/1973 | Nield et al. | 526/262 |
| 3,813,369 | 5/1974 | Latinen | 260/80.6 |
| 3,954,722 | 5/1976 | Echte | 526/68 |
| 4,068,064 | 1/1978 | Platt et al. | 526/194 |
| 4,141,934 | 2/1979 | Wingler et al. | 260/881 |
| 4,361,684 | 11/1982 | Minematsu et al. | 526/342 X |
| 4,427,832 | 1/1984 | Yagi et al. | 525/238 |
| 4,526,928 | 7/1985 | Mathumoto et al. | 526/342 X |
| 4,618,663 | 10/1986 | Nakagawa | 526/232.3 |
| 4,755,576 | 7/1988 | Zabrocki et al. | 526/342 |
| 4,795,780 | 1/1989 | Wingler et al. | 525/53 |

FOREIGN PATENT DOCUMENTS

| | | | |
|---|---|---|---|
| 0003986 | 5/1985 | European Pat. Off. | 526/342 |
| 0157314 | 10/1985 | European Pat. Off. | 526/342 |
| 150617 | 9/1981 | German Democratic Rep. | 526/342 |
| 236322 | 6/1986 | German Democratic Rep. | 526/342 |
| 6242409 | 2/1987 | Japan | 526/342 |
| 0762159 | 11/1956 | United Kingdom | 526/342 |

Primary Examiner—Joseph L. Schofer
Assistant Examiner—F. M. Teskin
Attorney, Agent, or Firm—Michael J. Murphy; William J. Farrington

[57] ABSTRACT

A method of forming polymers containing α-methylstyrene and acrylonitrile by polymerizing, preferably continuously, under off-azeotrope conditions to vastly improve rate without substantially changing the content of α-methylstyrene in the polymer being formed from that obtained under azeotrope conditions.

7 Claims, 2 Drawing Sheets

PROCESS FOR PREPARING α-METHYLSTYRENE-ACRYLONITRILE POLYMERS

BACKGROUND OF THE INVENTION

This invention relates to a process for forming polymers of α-methylstyrene and acrylonitrile and more particularly to polymerization rate improvements in such a process.

Polymers of chemically combined α-methylstyrene (AMS) and acrylonitrile (AN) containing about 70 weight % polymerized AMS are well known as possessing significantly higher heat distortion temperature (on the order of 17° C.) than a styrene (S)-acrylonitrile copolymer (SAN) of comparable styrene content. AN provides chemical resistance and toughness in the polymer. As typically disclosed in examples of UK 1,390,973, AMS/AN copolymers can be blended with impact resistant copolymers of styrene and acrylonitrile grafted on a diene rubber (ABS polymers) to improve the heat resistance of the latter. In this respect, AMS/AN copolymers at about a 70/30 weight ratio are chemically compatible with the ABS polymers and therefore conventionally used in such blends. Furthermore, a 70/30 AMS/AN weight ratio essentially represents the azeotropic composition, by which is meant the mixture containing a weight ratio of monomers which when polymerized provide the same ratio of chemically combined monomers in the polymer. As further known, it is desirable, when possible, to use the azeotropic composition during a polymerization since a different off-azeotrope ratio of monomers in a closed, batch polymerization system will produce a polymer composition corresponding to the proportion of monomers in the polymerizing medium. In the latter instance, the polymer undesirably varies widely in compositional distribution because of the changing composition of the monomers combining to form the polymer during the course of the polymerization. Thus, it seems conventional in the prior art to use the azeotropic composition of monomers which produce a polymer having the same ratio of chemically combined polymerized monomers.

As further known, (note U.S. Pat. No. 4,169,195) AMS polymerizes slower than styrene and this has typically been remedied in the prior art (note U.S. Pat. No. 4,618,663) by using special difunctional initiators to increase polymerization rate. Though this approach can be used, it is not without drawbacks; for example, such initiators are chemically complex and not inexpensive and, though used in minor amount, residues in the polymer can adversely affect the balance of performance properties. Moreover such special initiators produce only a marginal improvement in rate.

It would be desirable to have another way of increasing the notoriously slow polymerization rate of AMS in forming polymers with AN.

SUMMARY OF THE INVENTION

Now, improvements have been made which overcome aforementioned shortcomings of the prior art.

Accordingly, it is a principal object of this invention to provide a method of increasing the rate of formation of polymers containing AMS and AN.

Another object is to provide such a method which is flexible and readily adapted for use in continuous polymerization systems without sacrifice in the quality (compositional homogeneity) of polymer produced.

A further object is to provide such a method which can be commercially implemented in existing, large scale polymerization systems initially designed for faster styrene/acrylonitrile polymerizations.

Other objects of this invention will in part be obvious and will in part appear from the following description and claims.

These and other objects are accomplished by the discovery that the rate of polymerization of AMS and AN can be significantly increased with no effect on molecular weight and little effect on heat resistance and AN content of the polymer, by conducting the polymerization reaction under off-azeotrope conditions. Thus, it has been found that such polymerization rate will approximately double if the AN fraction in the reactively admixed, unconverted monomers is increased from 29 (which is the exact azeotrope composition) to 55 weight %. This vast increase in productivity permits production of such polymers in standard, commercial polymerization equipment which does not require custom fabrication to accommodate the increased residence times otherwise required at the significantly slower rate encountered under azeotropic conditions.

More specifically, there is provided a method of forming a polymer of AMS and AN which comprises polymerizing AMS and AN monomers, and optionally one or more other monomers in minor amount copolymerizable therewith, in a reaction medium containing a concentration of unpolymerized AMS which is lower by at least five weight % (preferably more than 10% and most preferably 15 to 25%) than the concentration of AMS in the polymer being simultaneously formed. The concentration of unpolymerized AMS is defined in this context as the fraction of AMS in the total polymerizable monomers mixture. Under such conditions, the rate is about 20 to 100% faster than the rate under azeotropic conditions. Also provided in a more specific aspect of the invention is a composition polymerizable to form a polymer containing 65 to 70 weight % AMS, such composition comprising a mixture of unconverted AMS and AN monomers wherein the weight fraction of AN therein is between 0.35 and 0.60, preferably between 0.40 to 0.57.

The noted increased off-azeotrope rate is not significantly adversely affected by including in the reactive polymerization mixture, a minor amount (up to 30 and preferably 20 weight %) of one or more additional monomers copolymerizable with the AMS-AN monomers. Such comonomers are preferably selected from the group consisting of maleic anhydride, imides of maleic anhydride, $C_1$ to $C_4$ alkyl acrylates and mixtures thereof.

BRIEF DESCRIPTION OF THE DRAWINGS

In describing the invention, reference will be made to the accompanying drawings wherein.

DETAILED DESCRIPTION OF PREFERRED EMBODIMENTS

Figure 1:
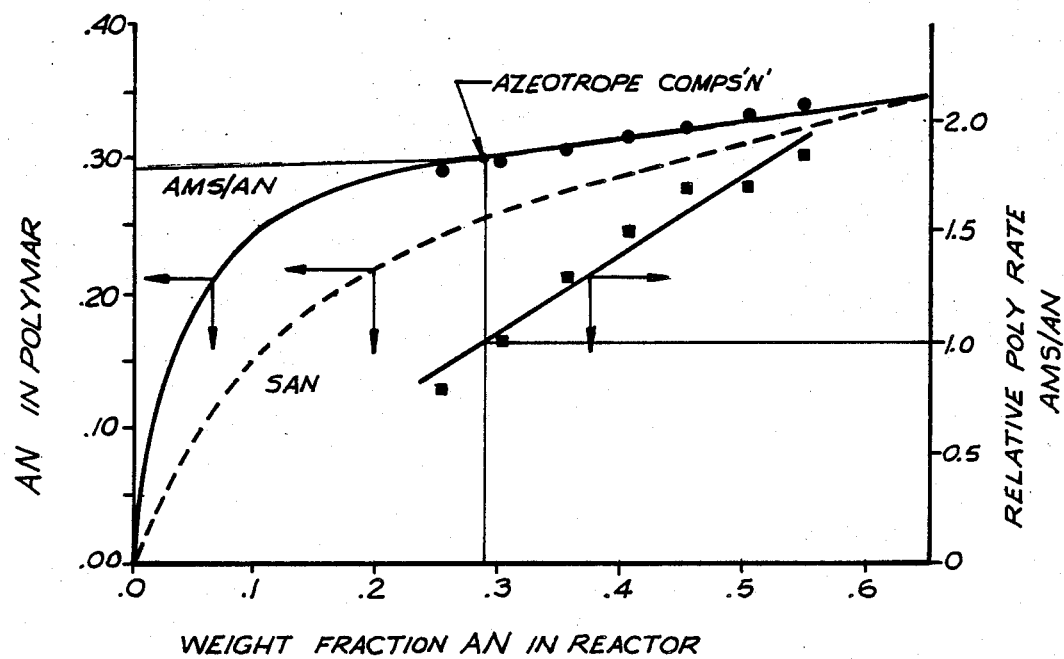
FIG. 1 is a plot depicting for AMS/AN polymers, how polymer composition varies with the composition and rate of polymerization of monomers used in their formation.

Referring now to the drawings, though not shown, the weight fraction of AMS along the abscissa is the numerical difference of one minus the noted AN weight fraction. With respect to poly rate in FIG. 1, the actual rate will depend on the specific reaction medium (including initiator type (if any) and amount) and temperature. For simplicity, the rate at the AMS/AN azeotrope is shown as unity in FIG. 1 and the remaining rate data points have been normalized to this value. However, in FIGS. 2 and 3 the actual initial poly rate data is shown which was obtained from a series of batch test tube polymerizations at 0.1% initiator at 115° C. which are further described hereinafter in Example 3. Except for replacing AMS with S, the polymerization conditions for the S/AN data in the drawings were identical to those for the AMS/AN cases.

From FIG. 1 the greater productivity (poly rate) operating off-azeotrope according to the invention without a significant change in the composition of the polymer being formed, can be readily perceived. The azeotropic concentration of unreacted monomers in a reaction medium where AMS and AN are being copolymerized is 0.29/0.71 weight fraction AN/AMS, since this is the concentration of polymerizing monomers producing the smae 0.29/0.71 weight fraction polymerized AN/AMS in the polymer. Under such azeotropic conditions, the monomers relative polymerization rate from FIG. 1 is 1.0. When the concentration of monomers in such zone is changed from 0.29/0.71 AN/AMS, the polymerization system is considered operating "off-azeotrope" and the reason for doing so is readily apparent from the rate increase shown. for instance, markedly departing from azeotrope conditions by increasing the weight fraction of polymerizing AN to 0.55 essentially doubles the polymerization rate, yet still results in a copolymer content of 32/68 AN/AMS weight fraction. This is due to the unexpected flatness of the polymer/-monomers composition curve in the off-azeotrope region corresponding to unreacted monomer concentrations greater than 0.29/0.71 AN/AMS, and specifically in the region 0.30 to 0.60 weight fraction AN. This means a copolymer can be produced at a great increase in production rate which does not significantly vary from the 70/30 AMS/AN content found compatible in blends with ABS where the function of the AMS/AN copolymer is to increase the heat resistance of the blend.

Figure 3:
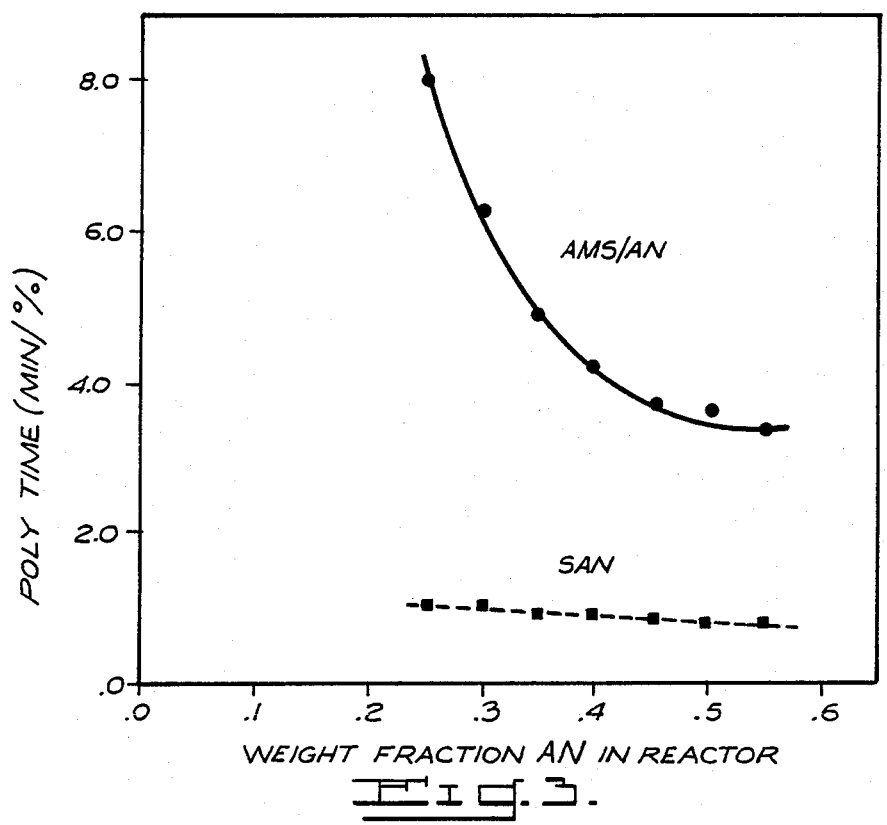
FIG. 3 is a plot emphasizing the marked difference in the polymerization rates of AMS/AN and S/AN monomers.
Figure 2:
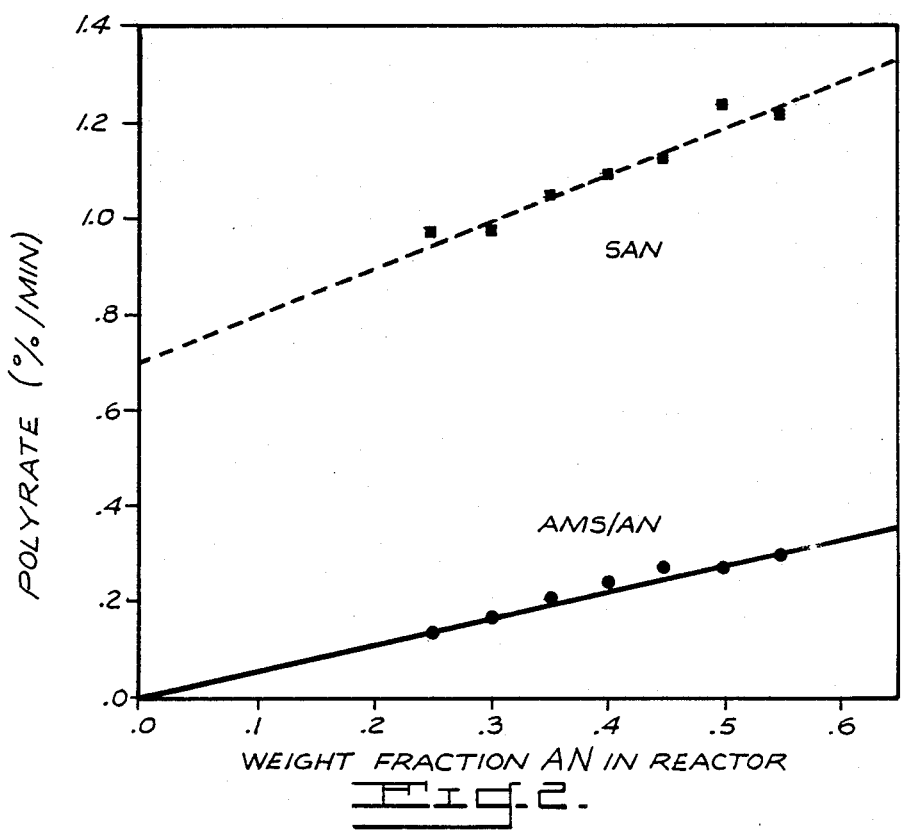
FIG. 2 is a plot showing how polymerization rate for AMS/AN monomer mixtures differs from that for S/AN monomers.

The drastic contrast in polymerization rate versus reaction monomers concentration for S/AN and AMS/AN copolymers is depicted in FIGS. 2 and 3, the latter differing from FIG. 2 only insofar as presenting rate in units which are the inverse of those in FIG. 2. At the azeotropic 26/74 weight fraction AN/S mixture of monomers in the reaction mixture which provides (dotted plot in FIG. 1) a 26/74 AN/S copolymer concentration, the polymerization rate of S and AN monomers is quite high at about 0.9 percent per minute (FIG. 2) versus the greatly reduced rate at the same monomers concentration of about 0.14 percent per minute in the AMS/AN case. Thus, because of (i) the rapid polymerization rate inherently achieved in forming S/AN copolymers, and (ii) the only gradual increase in rate in moving off-azeotrope (e.g. 20% increase to 1.2% per min. at 0.55 wt. fraction AN in the reaction mixture versus 0.9%/min at the azeotrope concentration), SAN polymerization provide no motivation to consider increasing rate by operating off azeotrope. However, as recognized by the invention, and as particularly depicted in FIG. 3, the increase in polymerization rate (or decrease in polymerization time) is 100 percent in the AMS/AN case in departing from the 0.29/0.71 AN/AMS azeotropic concentration to the 0.55/0.45 AN/AMS off-azeotropic condition.

Any free-radical polymerization process may be used in implementing the invention; for example, mass, emulsion, suspension, mass-suspension, solution etc. The process may be batch but is preferably continuous wherein reactants are continuously metered into and polymer is continuously withdrawn from the polymerization reaction zone. Continuous polymerization equipment systems in which the invention may be practiced are typically disclosed in U.S. Pat. Nos. 3,813,369 and 4,417,030. In batch processes, to operate off-azeotrope at a particular, relatively constant composition of polymerizing monomers in the reaction zone, and to promote polymer composition uniformity and therefore closer control of performance properties, AMS monomer should be continuously added to the closed polymerization zone to compensate for its greater consumption in chemically combining to form the polymer. Also usable in ways generally known to those skilled in the polymerization art, are conventional inert hydrocarbon solvents and diluents, known types of chain length regulators, suspending agents, inert lubricants and other process and product enhancing additives which can be added to the polymerizing monomers in the usual concentrations.

The AMS/AN polymerization of the invention may be carried out using thermally induced radical polymerization wherein the polymerization temperature is greater than 90° C. and preferably from about 100° C. to 125° C. Mono or difunctional initiators may be used which may provide process flexibility advantages, such as in tailoring the molecular weight of the polymer to a desired range. More specifically, when high molecular weight is desired (for example for polymer toughness) a particular initiator type and amount may be used while still benefiting from the high off-azeotrope rates of the invention. When a lower molecular weight is desired (for example for enhanced polymer flow) this may be achieved by merely increasing the initiator level without any sacrifice in the off-azeotrope rate. Initiators which may be used are disclosed in U.S. Pat. No. 4,618,663, the initiator disclosure of which is incorporated herein by reference. Typically usable are peroxy or azo compounds, e.g. t-butyl perbenzoate, 2, 5-dimethyl-2,5 bis(benzoylperoxy) hexane, 1-cyano-1-(t-butyl azo) cyclohexane, 2-t-butylazo-2-thiophenoxy-4-methyl pentane, t-butylperoxy-2-ethylhexanoate, 2,5-dimethyl 2,5-di(2-ethylhexanoylperoxy)-hexane, 00-t-butyl 0-(2-ethyl(hexyl)monoperoxycarbonate) and the like.

While necessary to employ α-methylstyrene and acrylonitrile monomers in forming polymers according to the process of the invention, one or more additional monomers copolymerizable therewith are optionally usable in minor amount in the monomers mixture. Such concentration of optional copolymerizable monomer(s) should be such as not in total to exceed 30, and preferably 20 wt. % in the polymer formed to avoid adversely affecting the increased poly rates of the invention. Exemplarily usable copolymerizable monomers include α- or β-unsaturated mono-basic acids and derivatives thereof, e.g., acrylic acid, methyl acrylate, ethylacrylate, butyl acrylate, 2 ethyl hexyl acrylate, methacrylic acid and corresponding esters thereof, such as methyl methacrylate, acrylamide and methacryl amide; vinyl halides such as vinyl chloride, vinyl bromide and vinylidine chloride, vinylidine bromide; vinyl esters such as vinyl acetate and vinyl propionate, dialkyl maleates or fumarates such as dimethyl maleate, diethyl maleate, dibutyl maleate; and maleic anhydride. Likewise usable are compounds such as acrylamide, maleimide, N-phenyl maleimide, N-alkyl maleimide, N-aryl maleimide or mixtures thereof. Also usable are styrene, o-, m-, and p-methyl styrenes, 2,4, dimethyl styrene, the corresponding ethyl styrenes, p-tert butyl styrene, alpha-ethyl styrene, alpha ethyl-p-methylstyrene, vinyl naphthalene, ar-halo monoalkenyl aromatic monomers such as o-chlorostyrene, m-chlorostyrene, p-chlorostyrene, o-bromostyrene, 2,4 dibromostyrene, t-butyl styrene and viny-alkyl, ring-halo-substituted styrenes, e.g. 2-methyl-4-chlorostyrene and 2,6-dichloro-4-methyl styrene. Preferred monomers are selected from the group consisting of maleic anhydride, imides of maleic anhydride, $C_1$ to $C_3$ alkyl acrylates and mixtures thereof. Most preferred are imides of maleic anhydrides.

The following Examples are set forth to illustrate more clearly the principles and practice of this invention to one skilled in the art. There is no intention to be restrictive but merely illustrative of the invention herein disclosed. Unless otherwise indicated, percentages are on a weight basis.

EXAMPLE 1

This invention Example illustrates the polymerization rate when preparing an AMS/AN copolymer from a 50/50% off-azeotrope composition of monomers.

A monomer mixture of 38 parts AN, 62 parts AMS with 0.3 parts tert-butyl peroctoate monofunctional free radical initiator dissolved therein was continuously charged to a polymerizing mixture having a substantially uniform, homogeneous composition in a single, stirred reactor operating at 60 percent polymer solids and 60 percent steady state monomers to polymer conversion. The temperature of the mixture was 115° C. and the feed monomers had an average residence time of about 1.5 hr. The monomer composition in the reactor was calculated, based on material balance, at about 50/50 percent AMS/AN and this yielded a copolymer having an acrylonitrile content of 32 percent. The polymerization rate (weight of polymer formed divided by residence time) was 40 percent per hour. The reaction mixture continuously withdrawn from the reactor was devolatilized continuously in a wiped film devolatilizer at 230° C. and 28 in of Hg to provide the AMS/AN copolymer.

The properties of the polymer obtained were as follows:

| | |
|---|---|
| Glass Transition Temperature ($T_g$) (°C.) | 121 |
| Percent AMS/AN (by elemental analysis) | 68/32 |
| Intrinsic viscosity ($\eta$) (dl/g) 25° C. in methylethyl ketone | 0.40 |
| $M_v$ (kg/mole) | 73 |

Control Example

This Example is not according to the invention.
The procedure of Example 1 was repeated except the initiator was difunctional Lupersol ® 256 (2,5 dimethyl 2,5- di(2-ethylhexanoylperoxy)-hexane) at 0.26% and the reactor feed was 30/70 percent AMS/AN. This represents nearly the azeotropic monomer composition which from FIG. 1 will provide an essentially equivalent 30/70 percent AMS/AN polymer composition. The solids content was 52% and the average residence time was 3.6 hours providing a significantly lower polymerization rate of 14%/hr which is 64% below that of Example 1. The properties of the polymer were as follows:

| | |
|---|---|
| Percent AMS/AN | 70/30 |
| Intrinsic viscosity (dl/g) 25° C. in MEK | 0.37 |
| $M_v$ (kg/mole) | 65 |

This Example illustrates the low rate when operating with essentially the azeotropic AMS/AN polymerizing monomers composition, which, in contrast to Example 1, renders existing commercial manufacturing equipment used to make S/AN polymers too small, or, conversely, shows the appreciable capital required to construct a new commercial polymerization line with larger sized equipment than that required when operating according to Example 1. It is also to be noted that even though a difunctional initiator was used in this control example, the poly rate is much slower and the polymer molecular weight is lower than in Example 1.

EXAMPLE 3

To determine the effect on poly rate in a polymerizing AMS/AN monomer mixture containing a third monomer in addition to AMS and AN, a series of batch polymerization in 6 mm diameter test tubes were carried out to various conversions at 115° C with a constant initiator (Lupersol ® TBEC) amount of 0.1 % based on monomers. The termonomer replaced an equal amount of AN in the monomers mixture. Results obtained were as follows:

| | Monomers Composition (%) | | | |
|---|---|---|---|---|
| Run | AMS | AN | Termonomers (monomer) (%) | Poly Rate (%/min) |
| 1 | 70 | 30 | — | 0.18 |
| 2 | 60 | 40 | — | 0.22 |
| 3 | 50 | 50 | — | 0.26 |
| 4 | 70 | 28 | n-phenyl maleimide-2 | 0.24 |
| 5 | 50 | 48 | n-phenyl maleimide-2 | 0.32 |
| 6 | 70 | 28 | maleic anhydride-2 | 0.24 |
| 7 | 50 | 48 | maleic anhydride-2 | 0.31 |
| 8 | 70 | 20 | methylmeth-acrylate - 10 | 0.13 |
| 9 | 50 | 40 | methymeth-acrylate - 10 | 0.23 |
| 10 | 70 | 20 | n-butyl-acrylate - 10 | 0.14 |
| 11 | 50 | 40 | n-butyl-acrylate - 10 | 0.23 |

The following results were obtained in analyzing the polymer made at the noted elapsed time, into the polymerization reaction.

| Run | Minutes at 115° C. | Tg (°C.) | η (dl/g) | Polymer Composition (%) AMS | AN | Termonomer |
| --- | --- | --- | --- | --- | --- | --- |
| 1 | 91 | 128 | 0.32 | 71 | 29 | — |
| 2 | 60 | 127 | 0.37 | 70 | 30 | — |
| 3 | 60 | 123 | 0.41 | 67 | 33 | — |
| 4 | 62 | — | 0.27 | 64 | 28 | 8 |
| 5 | 46 | — | 0.32 | 61 | 31 | 8 |
| 6 | 63 | — | 0.26 | 69 | 25 | 6 |
| 7 | 49 | — | 0.34 | 66 | 29 | 5 |
| 8 | 119 | 130 | 0.29 | 68 | 25 | 7 |
| 9 | 60 | 123 | 0.39 | 64 | 30 | 6 |
| 10 | 119 | 121 | 0.29 | 70 | 25 | 5 |
| 11 | 60 | 118 | 0.39 | 66 | 30 | 4 |

The rate and composition data for Runs 1–3 where a termonomer was not present were used in preparing the AMS/AN rate data plot of FIG. 2.

From the above data, it can be seen that for each run including a termonomer and with the lower AMS content (i.e. the off-azeotrope case) the polymerization rate was faster than for the 70 percent AMS composition. Moreover the plot of the monomers/polymer compositional relationship is still relatively flat in that the polymer composition changes considerably less than the monomers charge composition—e.g. AN in polymer changes only 3% in runs 4 and 5 for a 20% AN feed change. Also, this Example shows the tradeoff in Tg, molecular weight and poly rate occurring with choice of termonomer.

While certain specific embodiments of the invention have been described with particularity herein, it will be recognized that various modifications thereof will occur to those skilled in the art. The scope of the invention, therefore, is to be limited solely by the scope of the following claims.

We claim:

1. A method of forming a polymer of α-methylstyrene and acrylonitrile which comprises: polymerizing by free radical polymerization α-methylstyrene and acrylonitrile monomers, and optionally, in minor amount, one or more other monomers copolymerizable therewith, in a substantially uniform, homogenous reaction medium containing a concentration of unpolymerized α-methylstyrene which is lower by at least 5 weight % than the concentration of α-methylstyrene in the polymer being simultaneously formed, said monomers fed and said polymer withdrawn from the reaction medium continuously, the polymerization rate of said monomers being at least about 20% faster than the rate under azeotropic conditions.

2. The method of claim 1 wherein at least one monomer selected from the group consisting of maleic anhydride, imides of maleic anhydride, and $C_1$ to $C_4$ alkyl acrylates is copolymerized with the α-methylstyrene and acrylonitrile.

3. The method of claim 1 wherein the concentration of unpolymerized α-methylstyrene is more than 10 weight % less than the weight percent polymerized α-methylstyrene in the polymer being formed.

4. The method of claim 2 wherein the copolymerizable monomer is an imide of maleic anhydride.

5. The method of claim 4 wherein the imide is N-phenyl maleimide.

6. The method of any of claims 1, 2, 3, 5 or 6 wherein the concentration of unpolymerized α-methylstyrene is between about 15 to about 25 weight % below the weight percent polymerized α-methylstyrene in the polymer being formed.

7. A method of polymerizing α-methylstyrene and acrylonitrile which comprises continuously maintaining off-azeotrope conditions in a free radical substantially uniform, homogeneous polymerization medium wherein the weight fraction of acrylonitrile monomer is between 0.35 to 0.6 and the polymerization rate is about 20 to 100% faster than the rate under azeotropic conditions.

* * * * *

UNITED STATES PATENT AND TRADEMARK OFFICE
CERTIFICATE OF CORRECTION

PATENT NO. : 4,874,829
DATED : October 17, 1989
INVENTOR(S) : Chris E. Schwier and Wan C. Wu It is certified that error appears in the above-identified patent and that said Letters Patent is hereby corrected as shown below:

In col. 3, line 28, the word "smae" should read, instead, ---same---.

In col. 8, line 26, the numbers "5 or 6" should read, instead, ---4 or 5---.

Signed and Sealed this

Fourteenth Day of August, 1990

Attest:

HARRY F. MANBECK, JR.

*Attesting Officer*     *Commissioner of Patents and Trademarks*